United States Patent Office 3,409,527
Patented Nov. 5, 1968

3,409,527
PROCESS FOR PREPARING SEGMENTED HALO-
ETHYLENE POLYMERS IN THE PRESENCE OF
A DIALKYL DIXANTHATE
Norman A. Lefevre, Bay City, Harold G. Hahn, Midland, and William D. Shelburg, Bay City, Mich., assignors to The Dow Chemical Company, Midland, Mich., a corporation of Delaware
No Drawing. Filed Oct. 7, 1964, Ser. No. 402,328
6 Claims. (Cl. 204—159.17)

ABSTRACT OF THE DISCLOSURE

This invention relates to a process for preparing segmented haloethylene polymers by first polymerizing a haloethylene monomer in the presence of a dialkyl dixanthate having the formula:

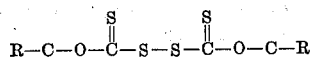

wherein R is an alkyl radical having from 1 to about 4 carbon atoms to form a polymer having terminal xanthate groups which groups produce free radicals when subjected to actinic radiation; then dissolving the so-formed haloethylene polymer in at least one monoethylenically unsaturated monomer, which monomer is capable of polymerization by addition reaction in the presence of such free radicals and polymerizing such monomer by exposure to actinic radiation.

---

It has long been desired to develop a polymerization process for the production of interpolymers of two or more monomer species in order to obtain a polymer having a certain combination of properties, which properties are not possessed by the corresponding individual homopolymers derived from the monomers employed. One method to accomplish the same has involved the investigation of the formation of segmented or block polymers, i.e., polymers which consist of separate chains of different monomer species coupled together to form a linear molecule. Up to the present invention, however, the methods which have been devised to produce such polymers have, in the main, been difficult to control to obtain a polymer of a certain desired composition. In addition, prior known methods are often particularly inapplicable in the field of polymerization of haloethylene polymers such as the polymers and interpolymers of vinylidene chloride and vinyl chloride monomers.

It is, therefore, an object of this invention to provide an easily accomplished polymerization process for the production of various segmentary or block-like polymers.

It is a further object to provide a process for the production of segmentary or block-like polymers based on haloethylene polymers.

Various objects and advantages will become obvious to those skilled in the art from the accompanying specification and claims.

The process of the present invention comprises the addition of one or more monoethylenically unsaturated monomers, by photochemically induced free-radical polymerization, onto a preformed polymer. In order to accomplish such addition, the first step is to prepare an active polymeric composition of desired molecular weight, by polymerization of the monomeric constituents of such polymer in the presence of a dialkyl dixanthogen chain transfer agent, as hereinafter more fully defined, in amounts and under conditions sufficient to provide polymer chains having one or more terminal photo-decomposable xanthogen groups. The so-formed active polymer is then dissolved in one or more monoethylenically unsaturated monomers and the mixture subjected to actinic radiation whereby the terminal xanthate groups form polymerization inducing free radicals.

Polymers which are advantageously employed in the present invention may be selected from a wide variety of polymers such as the polymers of vinyl chloride, copolymers of vinyl chloride and vinylidene chloride and polymers of vinylidene chloride, as well as the analogous fluorinated materials. However, the process of the present invention is especially well suited for the utilization of the normally crystalline polymers of vinylidene chloride which are recognized in the art as being those polymers of vinylidene chloride and its interpolymers in which vinylidene chloride predominates, and usually those in which vinylidene chloride exceeds about 70 percent.

The dialkyl dixanthate chain terminators employed by the present invention are those materials having the formula:

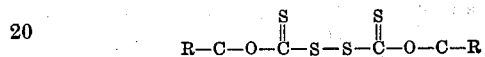

wherein R is an alkyl radical having from 1 to about 4 carbon atoms. It has been found that terminal groups formed from such materials are characterized by strong absorption of actinic radiation, particularly in the range of 275–280 millimicrons, and are further capable of scissions when exposed to such radiation to form free radicals which initiate polymerization of the monoethylenically unsaturated monomer constituents by addition reaction onto the polymer chain. It has further been found that utilization of such chain terminators precludes undesirable discoloration of haloethylene polymers as imparted by other photo-decomposable chain terminators such as tetraethylthiuran disulfide and the like amine-type compounds.

The active preformed polymers may be prepared by any technique conducive to polymerization of the polymerizable constituents. The preferred process of formation of such active polymers, however, comprises preparing an aqueous dispersion comprising an aqueous medium, one or more of the desired ethylenically unsaturated monomers that are capable of forming substantially water-insoluble addition polymers; and one or more of the herein defined dialkyl dixanthate chain terminators in amounts sufficient to provide polymer chains of desired size and having one or more photo-decomposable xanthate groups. Generally, the dialkyl dixanthates of the present invention are used in amounts of from about 0.05 to 5 percent based on monomer weight, depending on the products desired.

The so-formed active polymers are then admixed with one or more ethylenically unsaturated monomers, which are capable of dissolving such polymers under normal conditions of heat and pressure and which are further capable of undergoing polymerization induced by the presence of the free radicals generated by photodecomposition of the herein defined xanthate terminal groups. Exemplary of such monomers are the aliphatic carbonyl containing monoethylenically unsaturated compounds such as methyl, ethyl, propyl and butyl acrylates, methacrylates and ethacrylates, methyl isopropenyl ketone, methyl vinyl ether and mixtures thereof, among many others known to the art; various ankenyl aromatic monomers of the benzene series such as styrene, ortho-chlorostyrene, para-chlorostyrene, para-bromostyrene, alpha-methylstyrene and its nuclearly halogen or alkyl-substituted analogs such as para-methyl-alpha-methylstyrene and the like; and other monomers such as vinylidene chloride and the like.

When using active polymers based predominantly on vinylidene chloride, and particularly the normally crystalline vinylidene chloride resins, it is often advantageous to utilize a mixture of an aliphatic carbonyl containing monomer and an aromatic monomer, as herein described, for obtainment of optimum solubility of the active polymer. Exemplary of particularly useful monomer systems for active polymers containing predominant amounts of vinylidene chloride are mixtures composed of from about 50 to 75 weight percent of an aliphatic carbonyl containing monomer such as methyl methacrylate or methyl isopropenyl ketone and, complementarily, between about 25 and 50 weight percent of an aromatic monomer such as styrene, alpha-methylstyrene, vinyl toluene or divinyl toluene and the like. It is to be understood, however, that the monomer system employed need only be capable of adequately dissolving the preformed active polymer and of undergoing polymerization by addition reaction to the active polymer in the presence of the free radicals produced by the photodecomposition of the terminal xanthate groups present on the polymer chain.

In accordance with the present invention, the mixture of active polymer and polymerizable monomers is then subjected to actinic radiation, preferably of relatively high intensity in the range of about 275 to 280 millimicrons, until the desired segmented or blocklike polymer is formed. Generally, periods of between about 2 hours and 20 hours are adequate for completion of polymerization. The so-formed polymeric material may then be recovered by removal of residual monomer and/or washing with volatile solvents if desired.

The segmented or block-like polymers of this invention are particularly suited for use as durable, flexible, coatings for application to substrates such as regenerated cellulose, natural or synthetic fabrics and metal surfaces, and may be applied from solution by conventional coating techniques. Such polymers may also be molded into various end products such as films or sheets of varying thickness by conventional techniques or may be used as modifiers to impart flame-resistance or other properties to thermoplastic polymer materials.

The following example, wherein all parts and percentages are to be taken by weight, illustrates the present invention but is not to be construed as limiting its scope.

Example

A vinylidene chloride-acrylonitrile copolymer containing polymer chains having photo-decomposable xanthate end groups was prepared using the following ingredients in the stated ratio:

| | |
|---|---|
| Monomeric vinylidene chloride _____pounds__ | 7.8 |
| Monomeric acrylonitrile _____do____ | 0.9 |
| Hydrogen peroxide (35% aqueous solution)_do____ | 0.06 |
| Ferric chloride _____milliliters__ | 0.4 |
| Sodium salt of sulfosuccinic acid ester ___pounds__ | 0.2 |
| Diisopropyl dixanthogen _____do____ | 0.04 |

The mixture was agitated in about 1.5 parts of water per part of monomer in a glass-lined kettle, to form an emulsion; and amounts of concentrated nitric acid sufficient to provide a pH of from 3.5 to 4.0, added. The mixture was heated at about 57° C. for nearly 12 hours to form a polymeric material composed of about 90 weight percent vinylidene chloride and 10 weight percent acrylonitrile having an average particle size of between about 1200 and 1600 angstrom units. The polymer was obtained by coagulation of the emulsion by the addition thereto of two parts of a 0.4 percent aqueous solution of aluminum sulfate to 1 part of emulsion. The presence of terminal xanthate groups was evidenced by determination of the polymer optical density at 278 millimicrons. In such determination, a solution comprising 0.1 gram of the herein described polymer in 100 ml. of tetrahydrofuran was found to have an optical density of about 0.28, whereas a polymer of equivalent composition prepared in the absence of diisopropyl dixanthogen, showed no evidence of absorption at the indicated wave length.

The active polymer, as herein described, was then dissolved with agitation as a 20 percent solution in a monomeric mixture composed of two parts methyl methacrylate and one part of styrene. The mixture was then heated to a temperature of about 80° C., and subjected to actinic radiation of maximum intensity in the range of from about 275 to 280 millimicrons for a period of about 4 hours.

The reaction mixture was then cooled and redissolved as a 20 percent solution in tetrahydrofuran. Infrared analysis of the so-formed solution indicated the presence of a vinylidene chloride-acrylonitrile polymer having both styrene polymer and methyl methacrylate polymer units connected thereto.

By way of comparison, evidence of the formation of segmented or block-like polymer was not found in a portion of the same polymer reacted in the absence of photo-illumination, or in equivalent vinylidene chloride-acrylonitrile polymer compositions prepared in the absence of diisopropyl dixanthate.

It was further found that the segmented polymer of the present invention, when dissolved as 15 percent solids in a solvent composed of 65 weight percent tetrahydrofuran and 35 weight percent toluene at 30° C. and cast into unsupported films about 0.2 mil thick, produced flexible transparent film materials having a noticeably slower crystallization induction period as compared to identically prepared films from polymers produced by the method as described herein but in the absence of actinic radiation.

It is to be understood that the invention is not to be limited by the preferred embodiments thereof which are set forth in the foregoing description, but is to be interpreted in the light of what is set forth in the hereto appended claims.

What is claimed is:

1. A process for preparing segmented block haloethylene polymers comprising the sequential steps of:
   (1) polymerizing a haloethylene monomer in the presence of from 0.05 to 5 percent based on the weight of said monomer of a dialkyl dixanthate having the formula:

wherein R is an alkyl radical having from 1 to about 4 carbon atoms to form a polymer having terminal xanthate groups capable of producing free radicals when subjected to actinic radiation;
   (2) dissolving said haloethylene polymer in at least one monoethylenically unsaturated monomer, said monomer being capable of polymerization by addition reaction in the presence of said free radicals; and
   (3) block polymerizing said monomer onto said haloethylene polymer by exposing said solution of polymer in monomer to actinic radiation whereby a segmented block polymer is produced.

2. The process of claim 1 wherein said haloethylene polymer is chloroethylene polymer.

3. The process of claim 2 wherein said chloroethylene polymer is normally crystalline vinylidene chloride polymer.

4. The process of claim 3 wherein said normally crystalline vinylidene chloride polymer is a copolymer of vinylidene chloride and acrylonitrile.

5. The process of claim 4 wherein said monoethylenically unsaturated monomer is a mixture of styrene and methyl methacrylate.

6. The process of claim 5 wherein said mixture is comprised of from about 50 to 75 weight percent of methyl methacrylate and from about 25 and 50 weight percent of styrene.

(References on following page)

References Cited

UNITED STATES PATENTS

| | | | |
|---|---|---|---|
| 2,940,952 | 6/1960 | Miller | 204—159.16 |
| 2,716,633 | 8/1955 | Englehardt et al. | 204—159.24 |
| 3,047,544 | 7/1962 | Byrd | 260—79 |
| 3,189,663 | 6/1965 | Nozaki | 260—879 |

OTHER REFERENCES

R. J. Ceresa: Block and Graft Copolymers, Butterworth & Co. (1962), pp. 46–47.

MURRAY TILLMAN, *Primary Examiner.*

R. B. TURER, *Assistant Examiner.*